O. H. POLLEY & D. W. TOLES.
EARTH-AUGERS.
No. 187,670. Patented Feb. 20, 1877.
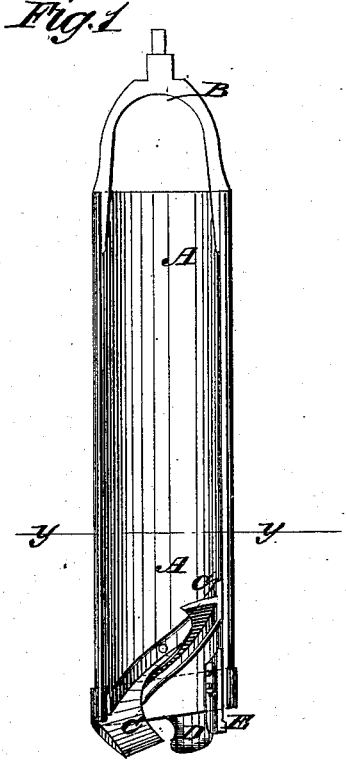
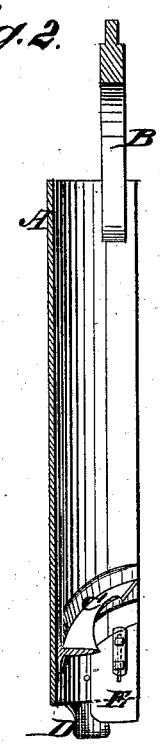
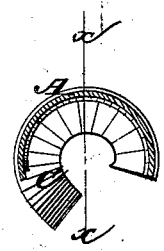

UNITED STATES PATENT OFFICE

ORSON H. POLLEY AND DWIGHT W. TOLES, OF PLYMOUTH, MICHIGAN.

IMPROVEMENT IN EARTH-AUGERS.

Specification forming part of Letters Patent No. 187,670, dated February 20, 1877; application filed March 6, 1876.

*To all whom it may concern:*

Be it known that we, ORSON H. POLLEY and DWIGHT W. TOLES, of Plymouth, in the county of Wayne and State of Michigan, have invented a new and useful Improvement in Earth-Augers, of which the following is a specification:

Figure 1 is a side view of our improved earth-auger. Fig. 2 is a vertical longitudinal section of the same, taken through the line $x$ $x$, Fig. 3. Fig. 3 is a cross-section of the same, taken through the line $y$ $y$, Fig. 1.

Similar letters of reference indicate corresponding parts.

The object of this invention is to furnish an improved earth-auger, simple in construction, convenient in use, and effective in operation, which may be readily repaired and kept in order, and which may be adjusted to enter the ground faster or slower, according to the hardness of the earth.

The invention will first be described in connection with the drawing, and then pointed out in the claim.

A is the jacket or body of the auger, which is made in the form of a two-thirds tube, and to the upper end of which is attached the bail B, by which it is coupled to the shaft. C is the main bit, which is made spiral, is secured to the inner surface of the lower part of the body A, and its lower end projects to enter the earth. The bit C is made of wrought-iron, and its point is forged solid, and laid with steel, so that it may be tempered and sharpened. D is the perpendicular bit or cutter, which is secured to the lower part of the body A, with its rear edge slightly inclined outward, so as to pack the earth around the hole, and thus render it less liable to cave. E is the adjustable feed-gage, which is slotted vertically, to receive the two bolts by which it is secured to the body A, so that it may be adjusted to project less or more, to cause the auger to enter the ground slower or faster, according to the hardness of the earth upon which the auger is operating.

Having thus described our invention, we claim as new and desire to secure by Letters Patent—

The combination of the adjustable feed-gage E with the body A of the auger, substantially as herein shown and described.

ORSON H. POLLEY.
DWIGHT W. TOLES.

Witnesses:
MARTIN KINYON,
J. F. HERDMAN.